US010598309B2

(12) United States Patent
Milekovic

(10) Patent No.: US 10,598,309 B2
(45) Date of Patent: Mar. 24, 2020

(54) STAND HEAD ASSEMBLY

(71) Applicant: CUSTOM MADE PRODUCT DEVELOPMENT PTY LTD, Revesby, New South Wales (AU)

(72) Inventor: Peter Milekovic, Miranda (AU)

( * ) Notice: Subject to any disclaimer, the term of this patent is extended or adjusted under 35 U.S.C. 154(b) by 1 day.

(21) Appl. No.: 15/781,209

(22) PCT Filed: Sep. 14, 2016

(86) PCT No.: PCT/AU2016/050859
§ 371 (c)(1),
(2) Date: Jun. 4, 2018

(87) PCT Pub. No.: WO2017/096419
PCT Pub. Date: Jun. 15, 2017

(65) Prior Publication Data
US 2019/0086024 A1    Mar. 21, 2019

(30) Foreign Application Priority Data
Dec. 7, 2015 (AU) .............................. 2015905063

(51) Int. Cl.
*F16M 11/10* (2006.01)
*B25H 1/00* (2006.01)
*F16M 11/28* (2006.01)

(52) U.S. Cl.
CPC ......... *F16M 11/105* (2013.01); *B25H 1/0007* (2013.01); *F16M 11/28* (2013.01); *F16M 2200/028* (2013.01)

(58) Field of Classification Search
CPC ................ F16M 11/105; F16M 11/28; F16M 2200/028; B25H 1/0007
See application file for complete search history.

(56) References Cited

U.S. PATENT DOCUMENTS 2,568,508 A * 9/1951 Montague ............ B25H 1/0007 269/51
4,239,196 A * 12/1980 Hanger ................ B25H 1/0007 269/17

(Continued)

Primary Examiner — Anita M King

(57) ABSTRACT

According to one aspect of the invention there is disclosed herein a stand head assembly (10). The stand head assembly (10) comprises a coupling (12) to facilitate coupling between an object to be supported and a stand body (14). The coupling (12) has an object face (16) adapted for operative attachment to the object to be supported, and an opposing support face (18) adapted for operative attachment to the stand body (16). The stand head assembly further comprises a drive assembly (20) which is operatively associated with the stand body (14) and adapted for attachment to the coupling (12). The drive assembly (20) includes a drive dog (22) which is operatively adapted to impart pivotal movement to the coupling. A securing assembly (24) is provided which is operatively adapted to secure the coupling to the drive assembly. The coupling (12) includes a drive slot (26) operatively associated with the drive dog (22) of the drive assembly. The drive slot is operatively adapted (i) to receive and hold the drive dog (22) and (ii) to provide a contact surface (28) to be acted upon by the drive dog (22) so as in use to impart pivotal movement to the coupling (12) and the object to which the coupling is mounted. In one embodiment the stand head assembly is incorporated in an engine stand.

13 Claims, 3 Drawing Sheets

(56) References Cited

U.S. PATENT DOCUMENTS

| | | | | |
|---|---|---|---|---|
| 6,431,535 B1* | 8/2002 | Volpe | ................. | B25H 1/0007 |
| | | | | 269/47 |
| 6,491,293 B1* | 12/2002 | Brewer | ................. | B25B 11/02 |
| | | | | 269/17 |
| 6,619,640 B1* | 9/2003 | Ploski | ................. | B23Q 1/52 |
| | | | | 269/17 |
| 7,237,758 B2* | 7/2007 | Nikolic | ................. | B25H 1/0007 |
| | | | | 248/127 |
| 2003/0062663 A1* | 4/2003 | Fox | ................. | B25H 1/0007 |
| | | | | 269/17 |
| 2005/0274867 A1* | 12/2005 | Kincaid | ................. | B25H 1/0007 |
| | | | | 248/664 |

* cited by examiner

STAND HEAD ASSEMBLY

FIELD

In one aspect the invention concerns a stand head assembly, particularly but not exclusively, a stand head assembly for an engine stand. Another aspect of the invention relates to a stand incorporating such stand head assembly.

BACKGROUND

Engine stands are mechanical tools used to support internal combustion engines during servicing or repair. Conventional engine stands typically comprise support structures to hold an engine in mid-air to allow a technician easy access to any area of the supported engine. Such stands support engines via their engine mounts or flywheel transmission cases. To enable ease of assembly and disassembly of an engine by a technician, engine stands are typically adapted to rotate an engine.

Most conventional engine stands require an engine to be rotated by hand and relies on friction and/or a locking bolt to secure the engine in a desired position. Technicians familiar with engine stands will readily attest to the fact that it can be rather difficult to rotate engines mounted on those stands, particularly where heavier engines are required to be rotated. To address this drawback some known engine stands incorporate a gearbox driven by an actuator.

Existing engine stands often tend to be difficult to secure to an engine. In the case of hand actuated engine stands, the engine is mounted to a mounting plate, the mounting plate spigot aligned and inserted to a head unit of the engine stand. Gearbox driven engine stands, on the other hand, require that an engine be bolted to a mounting plate or bolting of an engine mounting plate assembly to a mounting plate adapter. Both hand actuated and gearbox driven engine stands tend to be awkward to handle, and potentially dangerous, particularly when it is required to align their spigots or bolts respectively with a suspended engine of high mass.

OBJECT

It is the object of the present invention substantially to overcome or at least ameliorate one or more of the above problems encountered with existing engine stands.

SUMMARY

According to a first aspect of the present invention there is disclosed herein a stand head assembly comprising:

a coupling to facilitate coupling between an object to be supported and a stand body, the coupling having (i) an object face adapted for operative attachment to the object to be supported, and (ii) an opposing support face adapted for operative attachment to the stand body;

a drive assembly operatively associated with the stand body and adapted for attachment to the coupling, the drive assembly including a drive dog operatively adapted to impart pivotal movement to the coupling; and a securing assembly operatively adapted to secure the coupling to the drive assembly;

wherein the coupling includes a drive slot operatively associated with the drive dog of the drive assembly, the drive slot operatively adapted (i) to receive and hold the drive dog and (ii) provide a contact surface to be acted upon by the drive dog so as in use to impart pivotal movement to the coupling and the object to which the coupling is mounted.

Preferably the drive assembly comprises a drive face from which the drive dog outwardly extends, the drive face adapted for operative location adjacent the support face of the coupling when the drive dog is held within the drive slot.

Preferably the securing assembly comprises a first clamping member and a second clamping member.

Preferably the first clamping member is provided by the drive face of the drive assembly and the second clamping member comprises a coupling plate for operative location adjacent the object face of the coupling.

Preferably the coupling comprises at least one spacer which operatively extends outwardly from the object face of the coupling so as to maintain the coupling and the object to which the coupling is attached in a spaced apart relationship.

Preferably the spacer defines a bore adapted to hold a fastener for securing the coupling to the object.

Preferably the drive slot longitudinally extends inwardly from an edge of the coupling.

Preferably the drive slot defines a mouth in the edge of the coupling through which the drive dog is inserted into the drive slot.

Preferably the coupling plate comprises at least one coupling plate hole, the coupling comprises at least one coupling hole and the drive assembly comprises at least one drive assembly hole, wherein the at least one coupling plate hole, the at least one coupling hole and the at least one drive assembly hole are adapted to be placed in register to hold an elongate fastener.

Preferably the coupling plate comprises a plurality of coupling plate holes, the coupling comprises a plurality of coupling holes and the drive assembly comprises a plurality of drive assembly holes.

Preferably the drive assembly comprises a drive shaft.

Preferably the drive shaft is supported by a bearing housing.

Preferably the drive shaft is attached to a gearbox.

Preferably the stand body comprises an upright assembly.

Preferably the stand body is attached to the bearing housing.

Preferably the upright assembly comprises an upright sleeve and a support member slidably receivable within the upright sleeve so as to provide height adjustment of the upright structure.

Preferably the upright assembly includes a locking assembly to lock the upright assembly at a specified height adjustment.

Preferably the bearing housing is attached to the support member.

According to a second aspect of the present invention there is disclosed herein an engine stand head assembly comprising:

a coupling to facilitate coupling between an engine to be supported and an engine stand body, the coupling having (i) an engine face adapted for operative attachment to the engine to be supported, and (ii) an opposing support face adapted for operative attachment to the engine stand body;

a drive assembly operatively associated with the engine stand body and adapted for attachment to the coupling, the drive assembly including a drive dog operatively adapted to impart pivotal movement to the coupling; and a securing assembly operatively adapted to secure the coupling to the drive assembly;

wherein the coupling includes a drive slot operatively associated with the drive dog of the drive assembly, the drive slot operatively adapted (i) to receive and hold the drive dog and (ii) to provide a contact surface to be acted upon by the drive dog so as in use to impart pivotal movement to the coupling and the engine to which the coupling is mounted.

BRIEF DESCRIPTION OF THE DRAWINGS

Preferred embodiments of the invention will be described hereinafter, by way of examples only, with reference to the accompany drawings, wherein.

DESCRIPTION OF PREFERRED EMBODIMENTS

Figure 1:
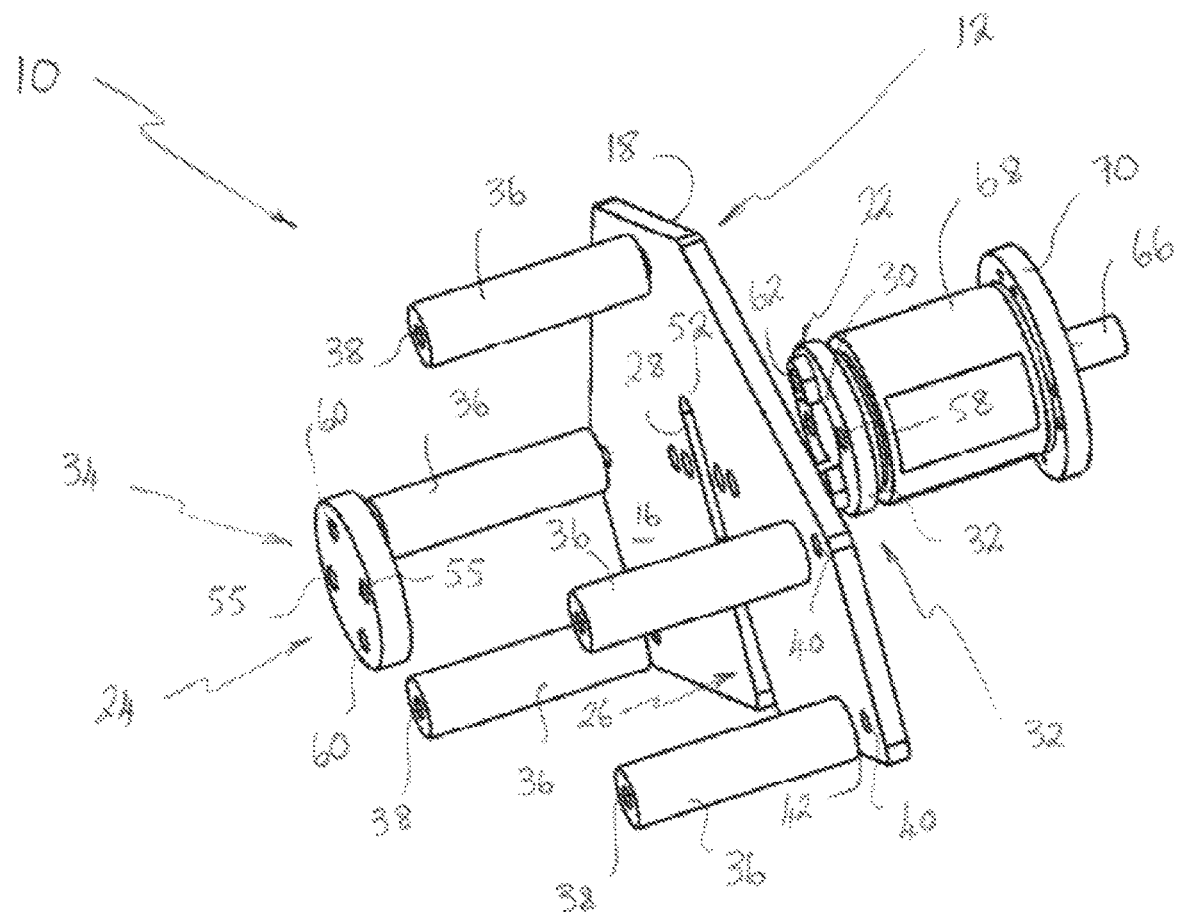
FIG. 1 is an exploded perspective view of an embodiment stand head assembly.
Figure 2:
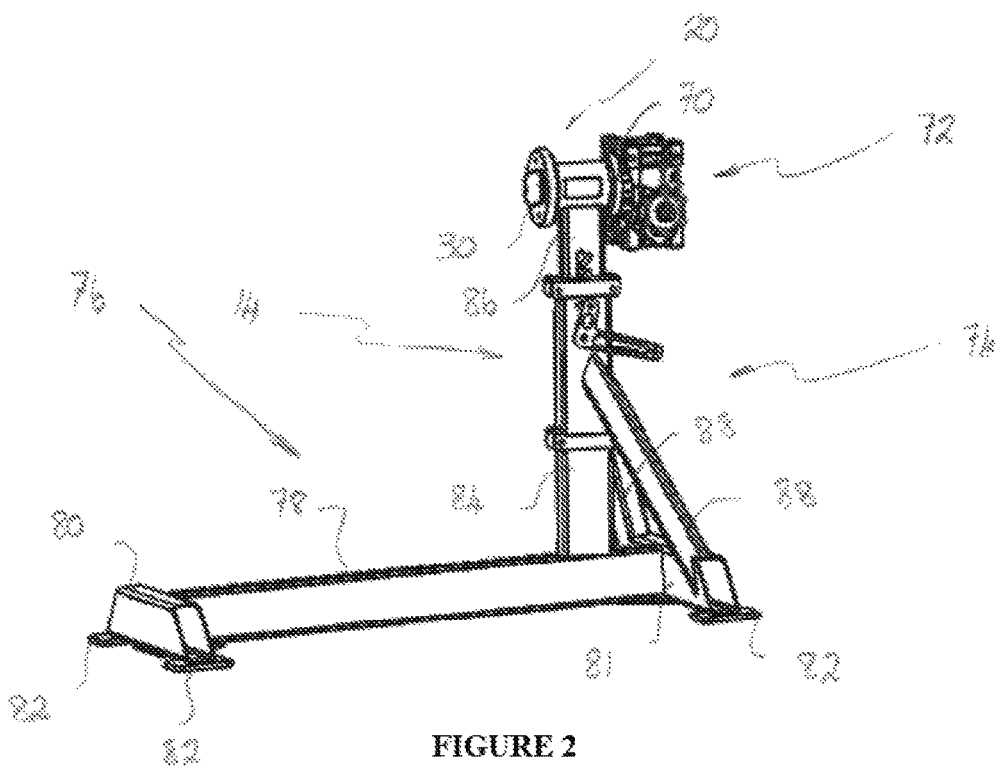
FIG. 2 is a perspective view of a stand body for operative attachment to the stand head assembly of FIG. 1.

FIG. 1 and FIG. 2 show components which are to be assembled to construct an embodiment stand head assembly, generally indicated with the reference numeral 10. The stand head assembly 10 firstly comprises a coupling 12, shown in FIG. 1. In the use the coupling 12 will serve to facilitate coupling between a non-illustrated engine and an upright engine stand body 14, shown in FIG. 2, which will support the engine in mid-air during a repair or servicing operation. The coupling 12 comprises an oblong body having planar surfaces, in this embodiment provided in the form of a metal plate. The coupling 12 has (i) an engine (object) face 16 which is adapted for operative attachment to the non-illustrated engine (object) and (ii) an opposing support face 18 which is adapted for operative attachment to the engine stand body 14.

The stand head assembly 10 further comprises a drive assembly 20 operatively associated with the engine stand body 14. The drive assembly 20 is adapted for operative attachment to the coupling 12. The drive assembly 20 further includes a drive dog 22 which in use is adapted to impart pivotal movement to the coupling 12. Such pivotal movement of the coupling 12 will also result in pivotal movement being imparted to the non-illustrated engine so that a technician is able to obtain access to all areas of the engine with relative ease. To secure the non-illustrated engine to the engine stand body 14, the stand head assembly 10 includes a securing assembly 24. The securing assembly 24 is operatively adapted to secure the coupling 12 to the drive assembly 20 in the manner discussed below.

Referring in particular to FIG. 1, the coupling 12 includes a drive slot 26 operatively associated with the drive dog 22 of the drive assembly 20. The drive slot 26 is operatively adapted (i) to receive and hold the drive dog 22 and (ii) provide a contact surface 28 to be acted upon by the drive dog 22 in order to impart pivotal movement to the coupling 12 and, in turn, the engine to which the coupling 12 is mounted.

The drive assembly 20 of the embodiment stand head assembly 10 comprises a drive face 30 from which the drive dog 22 outwardly extends. The drive face 30 is adapted for operative location adjacent the support face 18 of the coupling 12 when the drive dog 22 is held within the drive slot 26. Further, the securing assembly 24 comprises a (i) first clamping member 32, provided by the drive face 30 of the drive assembly 20 and (ii) a second clamping member 34 in the form of a coupling plate for operative location adjacent the engine face 16 of the coupling 12. The first and second clamping members 32 and 34 will in use act as a clamp for clamping the coupling 12 in position so as to ensure attachment to the engine stand body 14.

The embodiment coupling 12 comprises a plurality of spacers 36 which extend outwardly from the engine face 16 of the coupling 12. In use the spacers 36 will maintain the coupling 12 and the non-illustrated engine in a spaced apart relationship. Each of the spacers 36 define a bore 38 adapted to hold a non-illustrated fastener to secure the coupling 12 to the engine. Typically the fasteners will be located in the holes which normally hold the engine mounts. It will of course be appreciated that the fasteners could also be located in other suitable holes such as those used for securing a flywheel transmission case. A plurality of fastener holes 40 on the coupling 12 is provided through which the non-illustrated fasteners will pass through the spacers 36 to engage the non-illustrated engine.

Figure 3:
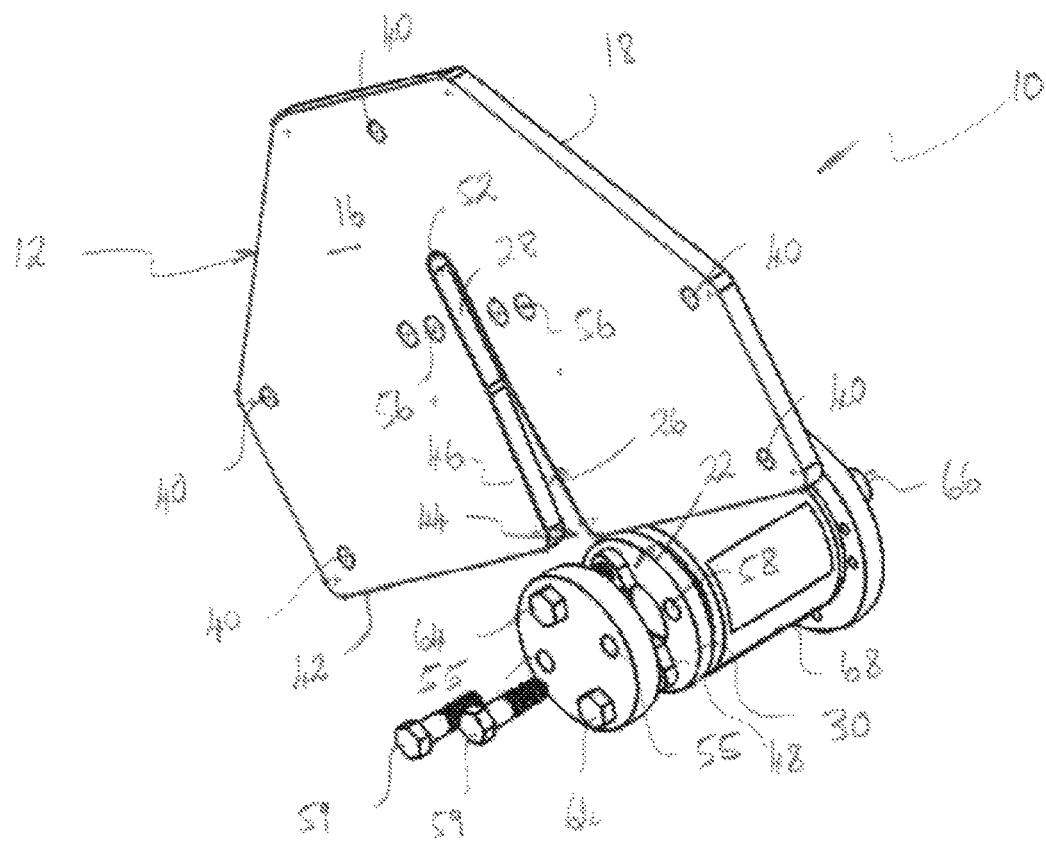
FIG. 3 is an exploded perspective view of a coupling of the stand head assembly of FIG. 1 aligned for coupling with a drive assembly of the head stand assembly.

Referring to FIGS. 1 and 3, the drive slot 26 of the coupling 12 extends longitudinally inwardly from an edge 42 of the coupling 12. As shown the drive slot 26 extends transversely across the coupling 12 and spans the width of the coupling 12 from the engine face 16 to the support face 18. The drive slot 26 defines a mouth 44 in the edge 42 of the coupling 12 through which the drive dog 22 is inserted into the drive slot 26.

The first step in supporting a non-illustrated engine with the embodiment stand head assembly 10 is to secure the coupling 12, via the spacers 36 and with suitable fasteners, to the engine. Hereafter the engine, with coupling 12 secured thereto, is hoisted into a position wherein the mouth 44 is aligned with the drive dog 22. The coupling 12 and engine can now be lowered so that the mouth 44 receives the drive 22 in order to be introduced into the drive slot 26. Continued lowering movement induced by the hoist will cause the coupling 12 to undergo movement relative to the drive dog 22. It will be noted in FIG. 3 that the drive slot 26 includes a tapering section 46 into which the mouth 44 opens. The tapering section 46 will facilitate ease of entry into a contact section 48 which provides the contact surface 28. Continued lowering movement results in the drive dog 22 slidably moving along the contact section 48 of the drive slot 26. The coupling 12 is located in position when a convex surface 50 of the drive dog 22 abuts a complemental concave surface 52 of the coupling 12.

The embodiment coupling plate 34 is disc-shaped and comprises a pair of coupling plate holes 55 while the coupling 12 comprises a plurality of coupling holes 56 and the drive assembly comprises a pair of drive assembly holes 58 in the drive face 30. To secure the coupling plate 34, the coupling 12 and the drive face 30, each respective coupling plate hole 54 is aligned with a coupling hole 56 and a drive assembly hole 58 so as to be in register. Such arrangement will enable elongate fasteners 59, here provided in the form of bolts, to be held in position.

The coupling plate 34 further includes a pair of drive assembly mounting holes 60 which are to be placed in register with a pair of drive dog holes 62 so as to receive a pair of fasteners 64, here provided in the form of bolts. The bolts 64 are sized to pass through the drive slot 26 of the coupling 12.

The drive assembly 20 comprises a drive shaft 66 supported by a bearing housing 68. The bearing housing 68 further includes an adapter 70 to facilitate attachment to a gearbox 72. A non-illustrated actuator, for example an electric motor, can in use be attached to the gearbox to drive the gearbox 72 to impart a torque to the drive shaft 66. Should a technician wish to rotate an engine mounted to the stand head assembly, the technician need simply activate the actuator which will impart, via the gearbox 72, a torque to the drive shaft 66. Imparting a torque to the drive shaft 66 will cause the coupling 12 to undergo pivotal movement whereby the engine will undergo rotation until a desired orientation is achieved and the technician deactivates the actuator.

Figure 4:
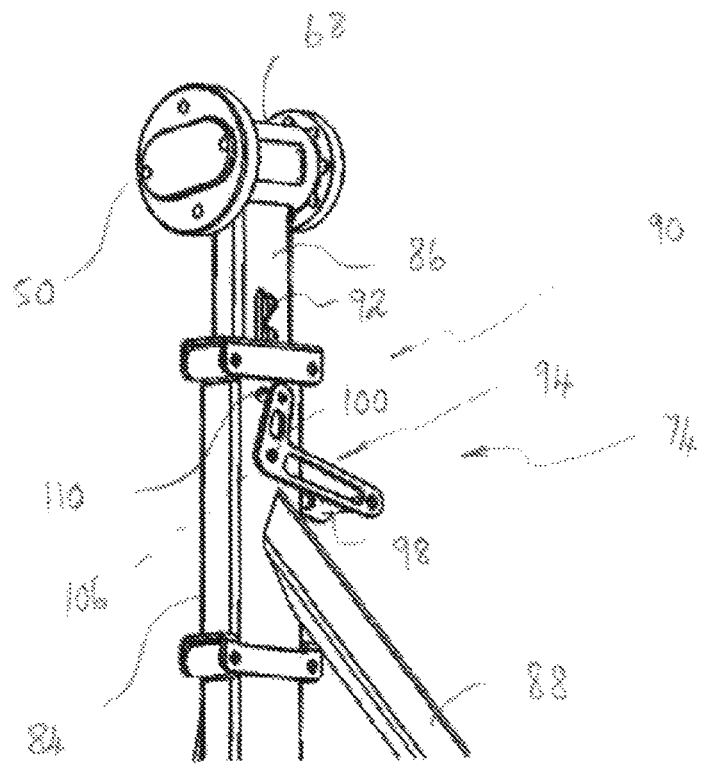
FIG. 4 is a perspective view of a portion of an embodiment stand body.

Referring in particular to FIGS. 2 and 4, the engine stand body 14 comprises an upright assembly 74 and a transverse base assembly 76. The base assembly 76 includes an elongate support beam 78 and two transverse support members 80, 81 located at opposing longitudinal ends of the support beam 78. The support members 80 are carried by spaced apart feet 82.

The upright assembly 74 comprises an upright sleeve 84 and a support member 86 slidably receivable within the upright sleeve 84 so as to provide height adjustment of the upright assembly 74, as discussed below. To support the upright sleeve 82 two brace members 88 are provided which extend between the upright sleeve 82 and the transverse support 81. As shown, the bearing housing 68 is mounted to the support member 88 at an operative upper end of the support member 88. Slidable movement of the support member 86 within the upright sleeve 84 will adjust the height of the bearing housing 68 relative to the support surface upon which the feet 82 are placed. Such adjustment will also adjust the height at which the engine is supported above the support surface by the coupling 12. Movement of the support member 86 relative to the upright sleeve 84 is effected by a non-illustrated height adjustment actuator. In this embodiment the height adjustment actuator is provided in the form of an hydraulic cylinder mounted within the upright sleeve 84 and coupled to the support member 86. By activating the non-illustrated cylinder a technician can effect height adjustment of an engine mounted to the coupling 12 to ensure that the engine is located at a level which will be suited to the physical height of the technician so as to facilitate relative comfort while working on the engine.

Figure 5:
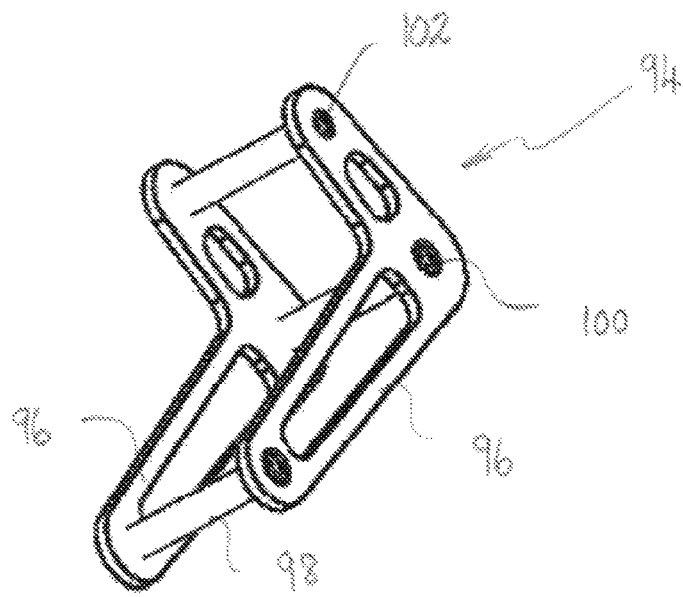
FIG. 5 is a perspective view of a locking member of the stand body of FIG. 4.
Figure 6:
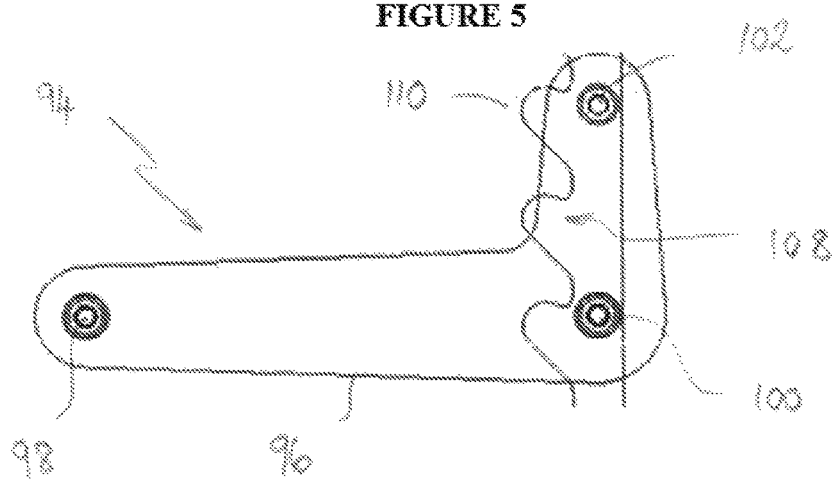
FIG. 6 is a schematic representation of the locking member of FIG. 5 in an unlocked orientation.
Figure 7:
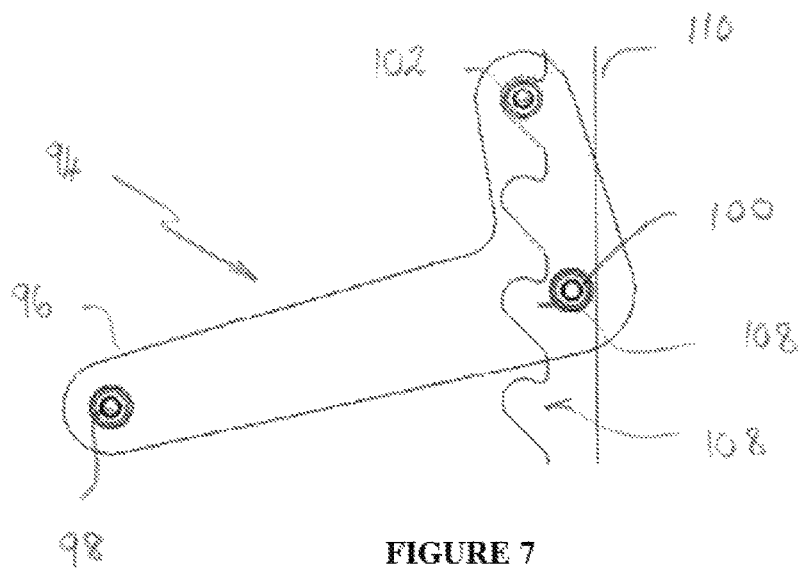
FIG. 7 is s schematic representation of the locking member of FIG. 5 in a locked orientation.

As a safety feature to maintain the support member 86 at a desired height, a locking assembly 90 is provided. The locking assembly 90 comprises a locking track 92 on the support member 86 and a locking member 94 operatively associated with the locking track 92. Referring also to FIGS. 5-7, the locking member 94 comprises two opposing, co-extensive and laterally spaced apart wings 96 which are connected via a handle pin 98, a pivot pin 100 and a locking pin 102. As shown in FIG. 4, the upright sleeve 84 includes an opposing pair of pivot pin holes 106 in which the pivot pin 104 is located. The locking track 92 comprises a plurality of recesses 108 in which the locking pin 102 can be located so as to secure the support member 86 in a desired height. The locking recesses 108 co-operate with an upright sleeve recess 110 in the upright sleeve 84 to facilitate adjustment and locking of the support member 86. To adjust the height of the support member 86, a user will grip the handle pin 98 and pivot the locking member 94 in an upward (clock-wise) direction to cause pivotal movement of the pivot pin 100 within the pivot pin holes 106, thus allowing the locking pin 102 to slide along the upright sleeve recess 110. The locking member 94 is now located in a released configuration such that the support member 86 can undergo longitudinal movement within the upright sleeve 84 responsive to activation of the non-illustrated actuator.

Once the support member 86, and as a consequence the supported engine, has reached a desired height, the user can cause the locking member 94 to move under the influence of its own weight in a downward (anti-clockwise direction). The locking pin 102 will now move along the upright sleeve recess 110 until a position is reached in which it co-operates with the locking track 92 to deter any longitudinal movement of the support member 86 within the upright sleeve 84.

It will be appreciated that although the above description has focussed on a stand head assembly for an engine stand, the assembly could be employed to support a range of objects.

Although the invention has been described with reference to specific examples, it will be appreciated by those skilled in the art that the invention may be embodied in many other forms.

The invention claimed is:

1. A stand head assembly comprising:
a coupling to facilitate coupling between an object to be supported and a stand body, the coupling having (i) an object face adapted for operative attachment to the object to be supported, and (ii) an opposing support face adapted for operative attachment to the stand body;
a drive assembly operatively associated with the stand body and adapted for attachment to the coupling, the drive assembly including a drive dog operatively adapted to impart pivotal movement to the coupling; and
a securing assembly operatively adapted to secure the coupling to the drive assembly;
wherein the coupling includes a drive slot operatively associated with the drive dog of the drive assembly, the drive slot operatively adapted (i) to receive and hold the drive dog and (ii) to provide a contact surface to be acted upon by the drive dog so as in use to impart pivotal movement to the coupling and the object to which the coupling is mounted;
wherein the drive assembly comprises a drive face from which the drive dog outwardly extends, the drive face adapted for operative location adjacent the support face of the coupling when the drive dog is held within the drive slot.

2. The stand head assembly according to claim 1, wherein the securing assembly comprises a first clamping member and a second clamping member.

3. The stand head assembly according to claim 2, wherein the first clamping member is provided by the drive face of the drive assembly and the second clamping member comprises a coupling plate for operative location adjacent the object face of the coupling.

4. The stand head assembly according to claim 3, wherein the coupling plate comprises at least one coupling plate hole, the coupling comprises at least one coupling hole and the drive assembly comprises at least one drive assembly hole, wherein the at least one coupling plate hole, the at least one coupling hole and the at least one drive assembly hole are adapted to be placed in register to hold an elongate fastener.

5. The stand head assembly according to claim 4, wherein the coupling plate comprises a plurality of coupling plate holes, the coupling comprises a plurality of coupling holes and the drive assembly comprises a plurality of drive assembly holes.

6. The stand head assembly according to claim 1, wherein the coupling comprises at least one spacer which operatively extends outwardly from the object face of the coupling so as to maintain the coupling and the object to which the coupling is attached in a spaced apart relationship.

7. The stand head assembly according to claim 6, wherein the spacer defines a bore adapted to hold a fastener for securing the coupling to an object.

8. The stand head assembly according to claim 1, wherein the drive slot longitudinally extends inwardly from an edge of the coupling.

9. The stand head assembly according to claim 8, wherein the drive slot defines a mouth in the edge of the coupling through which the drive dog is inserted into the drive slot.

10. The stand head assembly according to claim 1, wherein the stand body comprises an upright assembly.

11. The stand head assembly according to claim 10, wherein the upright assembly comprises an upright sleeve and a support member slidably receivable within the upright sleeve so as to provide height adjustment of the upright structure.

12. The stand head assembly according to claim 11, wherein the upright assembly includes a locking assembly to lock the upright assembly at a specified height adjustment.

13. An engine stand head assembly comprising:
a coupling to facilitate coupling between an engine to be supported and an engine stand body, the coupling having (i) an engine face adapted for operative attachment to the engine to be supported, and (ii) an opposing support face adapted for operative attachment to the engine stand body;
a drive assembly operatively associated with the engine stand body and adapted for attachment to the coupling, the drive assembly including a drive dog operatively adapted to impart pivotal movement to the coupling; and
a securing assembly operatively adapted to secure the coupling to the drive assembly;
wherein the coupling includes a drive slot operatively associated with the drive dog of the drive assembly, the drive slot operatively adapted (i) to receive and hold the drive dog and (ii) provide a contact surface to be acted upon by the drive dog so as in use to impart pivotal movement to the coupling and the engine to which the coupling is mounted,
wherein the drive assembly comprises a drive face from which the drive dog outwardly extends, the drive face adapted for operative location adjacent the support face of the coupling when the drive dog is held within the drive slot.

* * * * *